United States Patent
Ko et al.

(10) Patent No.: US 6,423,812 B1
(45) Date of Patent: Jul. 23, 2002

(54) PROCESS OF PREPARING POLYCARBONATES

(75) Inventors: Young Chan Ko, Seoul; Il Seok Choi, Kyunggi-do; Cheol-Hyun Kim, Ulsan; Kwang Soo Yoon, Kyungsangnam-do; Seung-Joo Kim, Ulsan; Kil-Yeong Choi; Jae Heung Lee, both of Daejeon; Kyong Soon Lee, Seoul, all of (KR)

(73) Assignees: Korea Research Institute of Chemical Technology, Daejeon; S-Oil Corporation, Seoul, both of (KR)

( * ) Notice: Subject to any disclaimer, the term of this patent is extended or adjusted under 35 U.S.C. 154(b) by 0 days.

(21) Appl. No.: 09/901,727

(22) Filed: Jul. 11, 2001

(30) Foreign Application Priority Data

Jul. 14, 2000 (KR) ........................................ 2000-40667

(51) Int. Cl.⁷ .............................................. C08G 64/00
(52) U.S. Cl. ........................................ 528/196; 528/198
(58) Field of Search .................................. 528/196, 198

(56) References Cited

U.S. PATENT DOCUMENTS 5,142,018 A    8/1992   Sakashita et al. ........... 528/199
5,221,761 A    6/1993   Jen et al. ..................... 558/268

FOREIGN PATENT DOCUMENTS

| EP | 0 584 801 A2 | 3/1994 |
| JP | 3-174443 | 7/1991 |
| JP | 7-3003 | 1/1995 |

*Primary Examiner*—Terressa M. Boykin
(74) *Attorney, Agent, or Firm*—Finnegan, Henderson, Farabow, Garrett & Dunner, LLP

(57) ABSTRACT

The present invention relates to a process of preparing polycarbonates and more particularly, to the process of preparing polycarbonates through a melt polymerization reaction of dihydroxyaryl compounds with diarylcarbonate, wherein said melt polymerization is performed in the presence of a mixed catalyst composed of an oxygen (O) or sulfur (S) containing compound having lone-pair electrons and an alkali metal or alkaline earth metal salt in an appropriate ratio at a reduced temperature by accelerating a reaction rate to obtain high quality polycarbonates with higher than 15,000 g/mole of a viscosity average molecular weight and improved color.

14 Claims, No Drawings

PROCESS OF PREPARING POLYCARBONATES

BACKGROUND OF THE INVENTION

Field of the Invention

The present invention relates to a process of preparing polycarbonates and more particularly, to the process of preparing polycarbonates through a melt polymerization reaction of a dihydroxy compound with a diarylcarbonate, wherein said melt polymerization is performed in the presence of a mixed catalyst composed of an oxygen (O) or sulfur (S) containing compound having lone-pair electrons and an alkali metal or alkaline earth metal salt in an appropriate ratio at a reduced temperature by accelerating a reaction rate to obtain high quality polycarbonates with higher than 15,000 g/mole of a viscosity average molecular weight and improved color.

Polycarbonates are known to have excellent properties in terms of transparency, impact resistance, mechanical strength and heat resistance, and thus have been widely used in industry in manufacturing transparent sheets, packaging materials, vehicle bumpers, compact discs and the like.

A representative preparing method of polycarbonates is an interfacial polymerization employing aqueous bisphenol A(BPA) solution substituted with sodium and a phosgene-containing organic solution. However, there are some disadvantages regarding to safety and ecological problems in that the phosgene used as a starting material and a chlorine-containing organic solvent used in the polymerization are extremely toxic. Furthermore, it requires excessive use of water to wash off the remaining chlorine-containing salts and un-reacted reactants after the polymerization.

A melt polymerization method, which produces polycarbonates by direct polymerization of starting materials in melt state under vacuum without using any solvents, has been introduced to solve the above problems. This method has several advantages over the above-mentioned interfacial polymerization in that it is possible to lower manufacturing cost, pelletize produced polycarbonate directly without any other treatment, and perform relatively simple apparatus.

Generally, the melt polymerization is carried at a temperature of 180–350° C. If the reaction temperature is lower than 180° C., it is difficult to remove phenol produced as a by-product during the polymerization thus resulting in polycarbonates with low molecular weight. On the other hand, if it is higher than 350° C., a by-product, which changes the product to a yellow color, can be generated or decomposition of the product may occur. Although it is known that the melt polymerization can be carried in the absence of a catalyst, it has to be exposed for a prolonged time at an elevated temperature of over 280° C. to complete the reaction. So the use of an effective polymerization catalyst is critical to attain high quality polycarbonate.

Theoretically, it is required to use the same molar amounts of hydroxyl group in bisphenol A and ester group in diphenylcarbonate to obtain high molecular weight of polycarbonates. However, because diphenylcarbonate is more volatile than bisphenol A, a little more diphenylcarbonate than bisphenol-A is desirable to obtain polycarbonates with superior physical properties. Generally, the molar ratio of diphenylcarbonate/bisphenol A is within the range from 1.0 to 1.3.

There have been many prior arts disclosing the melt polymerization to prepare polycarbonates by using a catalyst (U.S. Pat. No. 5,221,761 (1993), EP Patent No. 584801 (1993), and JP Patent Publication Nos. 7-003003 (1995) and 3-174443). Previously, the melt polymerization was performed employing a catalyst used in esterification or ester exchange reaction: (i) an alkali metal or alkali earth metal oxide or hydroxide; (ii) an alkali metal or alkali earth metal organic acid of inorganic acid; (iii) a sodium or potassium salt of phenol or bisphenol A; and (iv) an organic phosphorus and the like. Besides these catalysts, a nitrogen- or phosphorus-containing basic compound has been recently used as a catalyst as shown in U.S. Pat. No. 5,142,018. However, the process of preparing polycarbonates employing the catalyst mentioned above has posed serious problems in that the reaction requires a high reaction temperature and prolonged reaction time and the product assumes a yellow color.

Consequently, development of novel catalysts is highly required in order to produce high quality polycarbonates having improved color at a reduced temperature within a short period of time.

SUMMARY OF THE INVENTION

To solve aforementioned problems of the conventional melt polymerization methods of preparing polycarbonates in the presence of the catalyst, the present invention was completed by performing the melt polymerization in the presence of a mixed catalyst composed of a oxygen (O) or sulfur (S) containing compound having lone-pair electrons and an alkali metal or alkaline earth metal salt in an appropriate ratio.

Consequently, an object of this invention is to provide a method of preparing polycarbonates by using the mixed catalyst, which expedites the rate of the polymerization at a low temperature to the production of polycarbonates with high quality and improved color.

DETAILED DESCRIPTION OF THE PREFERRED EMBODIMENTS

In the process of preparing polycarbonates by melt polymerization of aromatic dihydroxy compound and diarylcarbonate in the presence of the catalyst, the present invention is characterized by using the mixed catalyst mixed in molar ratio of from 20:1 to 1:20 of an oxygen (O) or sulfur (S) containing compound having lone-pair electrons and an alkali metal or alkaline earth metal salt to produce high quality polycarbonates.

The present invention is described in detail as set forth hereunder.

The present invention relates to a process of preparing high quality polycarbonates with improved color tone by employing the mixed catalyst, which can expedite the rate of the polymerization at a low temperature.

The catalyst used in the present invention comprises a compound having lone-pair electrons of oxygen (O) or Sulfur (S) and an alkali metal or alkaline earth metal salt. The compound having lone-pair electrons in the catalyst provides excellent activity in the melt polymerization by incorporating with an alkali metal or alkaline earth metal salt. But when the compound having lone-pair electrons is used alone or when the alkali metal or alkaline earth metal salt is used alone, there is no significant catalytic activity increase in the polymerization and the polymerization rate is similar to that of the reaction performed without any catalyst. However, when the compound having lone-pair electrons is incorporated with an alkali metal or alkaline earth metal salt, it shows a synergy effect in the polymerization.

In the preparation of the catalyst, it is prefer to mix to be a molar ratio of the compound having lone-pair electrons to alkali metal or alkaline earth metal salt in the range of from 20:1 to 1:20. If the ratio is below 20:1, the polymerization rate becomes slow. If it exceeds 1:20, it results in color deterioration of the resulting product.

Examples of the compound having lone-pair electrons include oxygen-containing compound, sulfur-containing compound and a mixture thereof. Particular examples of said oxygen-containing compound are tetrahydrofuran, tetrahydropyran, 1,3-dioxane, 1,4-dioxane, 1,3-dioxepane, 1,3-dioxolan-2-one, tetronic acid, trimethylene oxide, and 1,3,5-trioxane. Particular examples of said sulfur-containing compound are tetrahydrothiophene, tetrahydrothiopyran-4-one, 1,4-thioxane, 1,3-dithiane, 1,3-dithiolane, ethylene trithiocarbonate, tetrahydrothiophen-3-one, thianaphthene, trimethylene sulfide, and 1,3,5-trithiane. Besides these compounds, other oxygen-containing and sulfur-containing compounds having lone-pair electrons can also be used. Particular examples of the alkali metal or alkaline earth metal salt of the present invention include potassium acetate, sodium acetate, rubidium acetate, cesium acetate, calcium acetate, magnesium acetate, zinc acetate and the like. The more-detailed description of the present method of preparing polycarbonates by the melt polymerization of aromatic dihydroxy compound and diarylcarbonate in the presence of the mixed catalyst is given hereunder.

An aromatic dihydroxy compound, a diarylcarbonate and a catalyst are placed into a reactor and heated to 170° C. and stayed for 1 hr to melt them. The reaction mixture is heated to 220–300° C. and reacted for 2 hrs under atmospheric pressure and is further reacted under pressure of 170 torr for 1 hr. The pressure is decreased to below 2 torr and is then reacted for additional 2 hrs to obtain the desired product.

The molar ratio of diarylcarbonate to aromatic dihydroxy compound is preferred to be in the range of 1 to 1.3 and that of catalyst used in the reaction is in the range of $10^{-7}$ to $10^{-2}$, more preferably $10^{-6}$ to $10^{-3}$ respectively.

The aromatic dihydroxy compound of the present invention is expressed by the formula (1),

wherein $Ar_1$ and $Ar_2$ represent independently phenyl group or its derivatives; and Z represents a single bond or —O—, —CO—, —S—, —SO$_2$—, —SO—, —CON(R$_1$)— or —C(R$_2$R$_3$)— linkage, where $R_1$, $R_2$ and $R_3$ are independently a hydrogen atom or —(CH$_2$)$_n$CH$_3$ respectively, where n is an integer of 0 to 4.

The diarylcarbonate of the present invention is expressed by the formula (2),

wherein $Ar_3$ and $Ar_4$ are independently phenyl or its derivatives.

A viscosity average molecular weight ($M_v$) of the polycarbonate prepared by the above-mentioned polymerization were estimated by using the following Equation 1, based on the intrinsic viscosity ([η]) measured at 25° C. in chloroform.

$$[\eta] = K \cdot M_v^a \qquad \text{Equation 1}$$

wherein K=0.012 cm$^3$/g and a=0.82.

And further, a color tone of the polycarbonate prepared by the above-mentioned polymerization is measured with chromoscope and a degree of the color was estimated by comparing b values.

The following examples are intended to be illustrative for the present invention and should not be construed as limiting the scope of this invention defined by the appended claims.

EXAMPLE 1

1 kg of a mixture consisting of bisphenol A (BPA) and diphenylcarbonate (DPC) mixed in the molar ratio of 1:1.06 was placed in a 2 L resin kettle kept at room temperature equipped with a stirrer, a nitrogen gas inlet, a reflux condenser, and a vacuum pump. 2.5×10$^{-4}$ mole of each tetrahydrofuran and potassium acetate, relative to 1 mole of bisphenol A were added to the reaction mixture. After eliminating moisture and oxygen by alternatively applying vacuum and a nitrogen gas three times respectively, the temperature of the reaction was gradually raised with a rate of 1.5° C./min with applying a nitrogen gas with a rate of 0.2 L/min. When the temperature was reached to 170° C., the reaction mixture was molten over 1 hr while keeping the temperature. And then the temperature was gradually raised to 240° C. and allowed to react for additional 2 hr while flowing a nitrogen gas with a rate of 0.2 L/min. After that, the reactor pressure was reduced to 170 torr by using a vacuum pump and the reaction continued for 1 hour. And further, the reactor pressure was reduced again to 0.2 torr and reacted for 100 min. Thus prepared polycarbonate was colorless and transparent and had the viscosity average molecular weight of 18,300 g/mole and b value of 5.

EXAMPLE 2

The reaction was performed in the same manner as Example 1 except that tetrahydrothiophene was used instead of tetrahydrofuran. Thus prepared polycarbonate had the viscosity average molecular weight of 18,200 g/mole.

COMPARATIVE EXAMPLE 1

The reaction was performed in the same manner as Example 1 except that no catalyst was added. Thus prepared polycarbonate was colorless and transparent and had the viscosity average molecular weight of 9,000 g/mole and b value of 4.

COMPARATIVE EXAMPLE 2

The reaction was performed in the same manner as Example 1 except that 2.5×10$^{-4}$ mole of each tetramethylammonium hydroxide, sodium bicarbonate and boric acid were used instead of tetrahydrofuran and potassium acetate as catalyst. Thus prepared polycarbonate was colorless and transparent and had the viscosity average molecular weight of 16,500 g/mole and b value of 5.

The result of Examples 1–2 and Comparative Examples 1–2 are summarized in Table 1

TABLE 1

| | Catalyst | Reaction time (min) | Viscosity average molecular weight | b value |
|---|---|---|---|---|
| Example 1 | Tetrahydrofuran/ potassium acetate | 100 | 18,300 | 5 |
| Example 2 | Tetrahydrothiophene/ potassium acetate | 100 | 18,200 | 5 |

TABLE 1-continued

| | Catalyst | Reaction time (min) | Viscosity average molecular weight | b value |
|---|---|---|---|---|
| Comparative Example 1 | — | 100 | 9,000 | 4 |
| Comparative Example 2 | Tetramethylammonium hydroxide, sodium bicarbonate and boric acid | 100 | 16,500 | 5 |

As shown in Table 1, viscosity average molecular weights of the polycarbonates prepared in Examples 1 and 2 are much higher than that of the polycarbonate prepared without using a catalyst in Comparative Example 1 and higher than that of the polycarbonte prepared by using a catalyst disclosed in U.S. Pat. No. 5,142,018 in Comparative Example 2. And the polycarbonates prepared in Examples 1 and 2 are more clear than those of prepared in Comparative Examples 1 and 2.

EXAMPLE 3

The reaction was performed in the same manner as Example 1 except that tetrahydrothiopyran-4-one was used instead of tetrahydrofuran. Thus prepared polycarbonate after reaction under the vacuum for 120 min had the viscosity average molecular weight of 17,300 g/mole and b value of 5.

COMPARATIVE EXAMPLE 3

The reaction was performed in the same manner as Example 1 except that only tetrahydrofuran was used as catalyst and potassium acetate was not added. Thus prepared polycarbonate after reaction under the vacuum for 120 min had the viscosity average molecular weight of 4,400 g/mole and b value of 4.

COMPARATIVE EXAMPLE 4

The reaction was performed in the same manner as Example 1 except that only potassium acetate was used as catalyst and tetrahydrofuran was not added. The reaction was performed with potassium acetate itself according to Example 1. Thus prepared polycarbonate after reaction under the vacuum for 120 min had the viscosity average molecular weight of 11,900 g/mole and b value of 5.

COMPARATIVE EXAMPLE 5

The reaction was performed in the same manner as Example 1 except that only 4-dimethylamino pyridine which was disclosed in U.S. Pat. No. 5,548,041 was used as catalyst. Thus prepared polycarbonate after reaction under the vacuum for 120 min had the viscosity average molecular weight of 14,300 g/mole and b value of 6.

The result of Example 3 and Comparative Examples 3–5 are summarized in Table 2.

TABLE 2

| | Catalyst | Reaction time (min) | Viscosity average molecular weight | b value |
|---|---|---|---|---|
| Example 3 | Tetrahydrothiopyran-4-one/ potassium acetate | 120 | 17,300 | 5 |
| Comparative Example 3 | Tetrahydrofuran | 120 | 4,400 | 4 |
| Comparative Example 4 | Potassium acetate | 120 | 11,900 | 5 |
| Comparative Example 5 | 4-dimethylamino pyridine | 120 | 14,300 | 6 |

As indicated in Table 2, when oxygen-containing or sulfur-containing compound itself or alkali metal salt itself was used in the polymerization, the increasing rates of the viscosity average molecular weight were much slower or similar to that when any catalyst was not used in the polymerization of Comparative Example 1. Accordingly, the co-use of both oxygen-containing or sulfur-containing compound and alkali metal salt is essential and shows a synergy effect in the polymerization of the present invention.

EXAMPLE 4

The reaction was performed in the same manner as Example 1 except that 1,4-dioxane was used instead of tetrahydrofuran. Thus prepared polycarbonate after reaction under the vacuum for 40 min and 70 min were colorless and transparent had the viscosity average molecular weights of 18,000 and 21,500 g/mole respectively and b values of both were 4.

EXAMPLE 5

The reaction was performed in the same manner as Example 1 except that tetrahydropyran was used instead of tetrahydrofuran. Thus prepared polycarbonate after reaction under the vacuum for 100 min had the viscosity average molecular weight of 18,100 g/mole and b value of 5.

EXAMPLE 6

The reaction was performed in the same manner as Example 1 except that 1,3-dithiane was used instead of tetrahydrofuran. Thus prepared polycarbonate after reaction under the vacuum for 40 min was colorless and transparent and had the viscosity average molecular weight of 17,000 g/mole and b value of 5.

EXAMPLE 7

The reaction was performed in the same manner as Example 1 except that 1,4-thioxane was used instead of tetrahydrofuran. Thus prepared polycarbonate after reaction under the vacuum for 40 min was colorless and transparent had the viscosity average molecular weight of 17,300 g/mole and b value of 5.

The result of Examples 4–7 is summarized in Table 3.

TABLE 3

| | Catalyst | Reaction time (min) | Viscosity average molecular weight | b value |
|---|---|---|---|---|
| Example 4 | 1,4-dioxane/potassium acetate | 40 | 18,000 | 4 |
| | | 70 | 21,500 | 4 |
| Example 5 | Tetrahydropyran/ potassium acetate | 100 | 18,100 | 5 |
| Example 6 | 1,3-dithiane/potassium acetate | 40 | 17,000 | 5 |
| Example 7 | 1,4-thioxane/potassium acetate | 40 | 17,300 | 5 |

EXAMPLE 8

The reaction was performed in the same manner as Example 1 except that the reaction temperature was performed at a lower temperature of 220° C. instead of 240° C. Thus prepared polycarbonate after reaction under the vacuum for 100 min had the viscosity average molecular weight of 17,000 g/mole and b value of 5.

EXAMPLE 9

The reaction was performed in the same manner as Example 1 except that the amount of potassium acetate was reduced to $6 \times 10^{-5}$ mole for each mole of BPA. Thus prepared polycarbonate after reaction under the vacuum for 65 min had the viscosity average molecular weight of 16,900 g/mole and b value of 3.

As described above, the melt polymerization of the present invention is performed in the presence of the mixed catalyst in an appropriate ratio of the compound having lone-pair electrons and alkali metal or alkaline earth metal salt, which can expedite the polymerization rate at a low temperature, to produce high quality polycarbonates having high molecular weight and improved color tone.

What is claimed is:

1. A process of preparing polycarbonates by melt polymerization of an aromatic dihydroxy compound and a diarylcarbonate in the presence of a catalyst, wherein said catalyst comprises a compound having lone-pair electrons of oxygen (O) or sulfur (S) and an alkali or alkaline earth metal salt in the molar ratio of 20:1 to 1:20.

2. The process of preparing polycarbonates according to claim 1, wherein said catalyst is used in the range of $10^{-7}$ to $10^{-2}$ mole to 1 mole of the aromatic dihydroxy compound.

3. The process of preparing polycarbonates according to claim 1, wherein said compound having lone-pair electrons is an oxygen-containing compound selected from the group consisting of tetrahydrofuran, tetrahydropyran, 1,3-dioxane, 1,4-dioxane, 1,3-dioxepane, 1,3-dioxolan-2-one, tetronic acid, trimethylene oxide, and 1,3,5-trioxane.

4. The process of preparing polycarbonates according to claim 1, wherein said compound having lone-pair electrons is an sulfur-containing compound selected from the group consisting of tetrahydrothiophene, tetrahydrothiopyran-4-one, 1,4-thioxane, 1,3-dithiane, 1,3-dithiolane, ethylene trithiocarbonate, tetrahydrothiophen-3-one, thianaphthene, trimethylene sulfide, and 1,3,5-trithiane.

5. The process of preparing polycarbonates according to claim 1, wherein said alkali metal or alkaline earth metal salt is selected from the group consisting of potassium acetate, sodium acetate, rubidium acetate, cesium acetate, calcium acetate, magnesium acetate, and zinc acetate.

6. The process of preparing polycarbonates according to claim 1 or claim 5, wherein said catalyst is a mixed catalyst of tetrahydrofuran and potassium acetate.

7. The process of preparing polycarbonates according to claim 1 or claim 5, wherein said catalyst is a mixed catalyst of tetrahydrothiophene and potassium acetate.

8. The process of preparing polycarbonates according to claim 1 or claim 5, wherein said catalyst is a mixed catalyst of tetrahydrothiopyran-4-one and potassium acetate.

9. The process of preparing polycarbonates according to claim 1 or claim 5, wherein said catalyst is a mixed catalyst of 1,4-dioxane and potassium acetate.

10. The process of preparing polycarbonates according to claim 1 or claim 5, wherein said catalyst is a mixed catalyst of tetrahydropyran and potassium acetate.

11. The process of preparing polycarbonates according to claim 1 or claim 5, wherein said catalyst is a mixed catalyst of 1,3-dithiane and potassium acetate.

12. The process of preparing polycarbonates according to claim 1 or claim 5, wherein said catalyst is a mixed catalyst of 1,4-thioxane and potassium acetate.

13. The process of preparing polycarbonates according to claim 1 or claim 5, wherein said aromatic dihydroxy compound is bisphenol A.

14. The process of preparing polycarbonates according to claim 1 or claim 5, wherein said diarylcarbonate is diphenylcarbonate.

* * * * *